US009224183B2

(12) United States Patent
Bernstein et al.

(10) Patent No.: US 9,224,183 B2
(45) Date of Patent: Dec. 29, 2015

(54) PROJECTION OF A PLURALITY OF STRUCTURED LIGHT PATTERNS

(75) Inventors: Arie Bernstein, Kfar Saba (IL); Ziv Aviv, Bat Hefer (IL)

(73) Assignee: Intel Corporation, Santa Clara, CA (US)

( * ) Notice: Subject to any disclaimer, the term of this patent is extended or adjusted under 35 U.S.C. 154(b) by 172 days.

(21) Appl. No.: 13/997,872

(22) PCT Filed: Mar. 28, 2012

(86) PCT No.: PCT/US2012/031007
§ 371 (c)(1),
(2), (4) Date: Jun. 25, 2013

(87) PCT Pub. No.: WO2013/147772
PCT Pub. Date: Oct. 3, 2013

(65) Prior Publication Data
US 2014/0226863 A1    Aug. 14, 2014

(51) Int. Cl.
*G06F 17/50* (2006.01)
*G06T 1/00* (2006.01)
*G01B 11/25* (2006.01)

(52) U.S. Cl.
CPC .......... *G06T 1/0014* (2013.01); *G01B 11/2513* (2013.01); *G06T 2207/10028* (2013.01); *G06T 2207/20068* (2013.01); *G06T 2207/20208* (2013.01)

(58) Field of Classification Search
CPC ............. G03F 7/705; G03F 1/36; G03F 1/70; G03F 7/70666; G03F 7/70433; G03F 7/70383; G03F 7/70441; G03F 1/20; G03F 7/70616; G03F 1/24; G03F 1/72; G03F 17/50; G03F 17/5081; G03F 3/1215; G03F 2217/01
USPC .................................... 716/50–55; 430/5, 30
See application file for complete search history.

(56) References Cited

U.S. PATENT DOCUMENTS

| 5,866,300 | A | 2/1999 | Satoh et al. |
|---|---|---|---|
| 2003/0024899 | A1* | 2/2003 | Iiduka et al. .................... 216/41 |
| 2004/0119029 | A1* | 6/2004 | Nagata et al. ............. 250/492.22 |
| 2004/0159636 | A1 | 8/2004 | Sandstrom et al. |
| 2005/0076322 | A1* | 4/2005 | Ye et al. .......................... 716/20 |
| 2006/0228010 | A1 | 10/2006 | Rubbert et al. |

OTHER PUBLICATIONS

International Search Report and Written Opinion received for PCT application No. PCT/US2012/031007, mailed on Nov. 16, 2012, 12 pages.
International Preliminary Report on Patentability received for PCT Patent Application No. PCT/US2012/031007, mailed on Oct. 9, 2014, 6 pages.

* cited by examiner

*Primary Examiner* — Nghia Doan
(74) *Attorney, Agent, or Firm* — Jordan IP Law, LLC

(57) ABSTRACT

Systems and methods may provide for projection of a plurality of structured light patterns. In one example, the method may include generating a low-resolution pattern image utilizing a returned image, wherein the low-resolution pattern image is an approximation of an image that would have been generated utilizing a low-resolution pattern and generating a high-resolution pattern image utilizing a preprocessed returned image and a preprocessed low-resolution pattern image, wherein high-resolution pattern image is an approximation of an image that would have been generated utilizing a high-resolution pattern.

27 Claims, 5 Drawing Sheets

200

300

400

PROJECTION OF A PLURALITY OF STRUCTURED LIGHT PATTERNS

BACKGROUND

1. Technical Field

Embodiments generally relate to structured light patterns. More particularly, embodiments relate to providing projection of a plurality of structured light patterns.

2. Discussion

Structured light may be used to project a known pattern of pixels onto a target image. When an image is returned, the manner in which the pattern of pixels is deformed may allow a vision system to calculate depth and surface information in the target image.

However, in some cases, particular aspects of a scene may require more particular consideration. For example, in order to appear in an equal resolution as nearer objects, objects within the scene that are farther away may require finer features. In these cases, utilizing one pattern may be inadequate.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
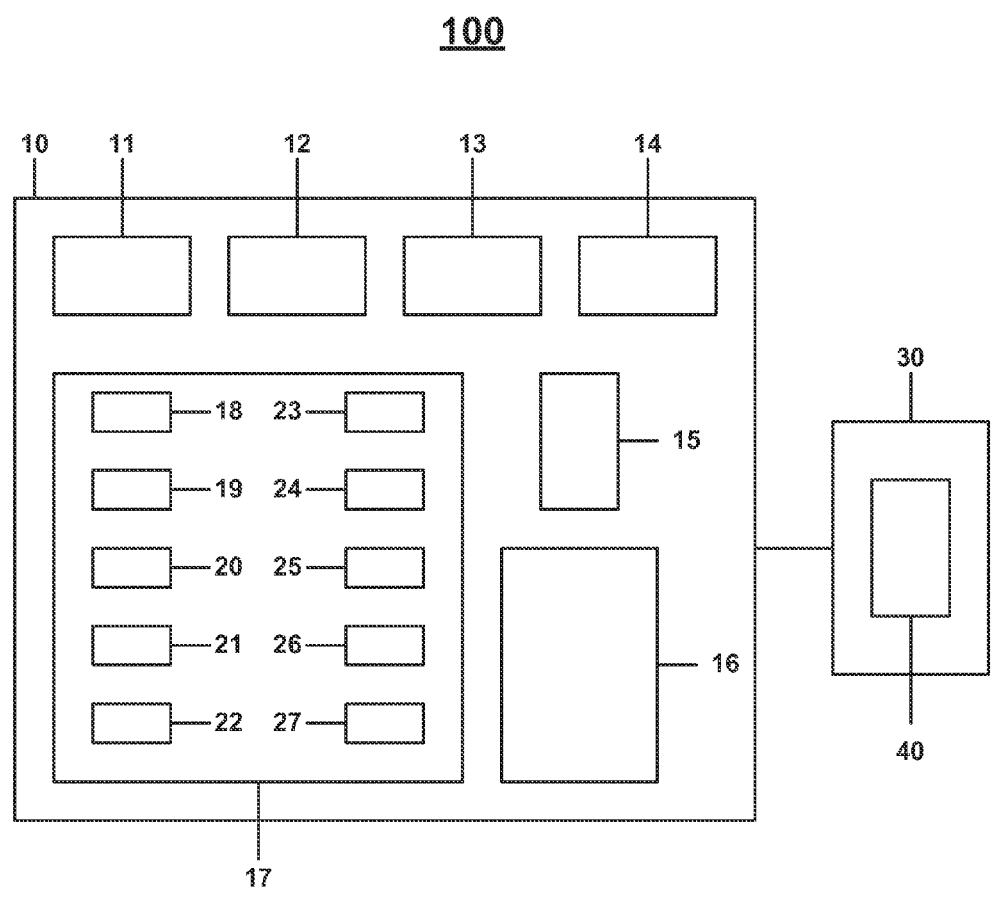
FIG. 1 is a block diagram of an example of a computer system that may provide projection of a plurality of structured light patterns in accordance with an embodiment of the invention.

Turning now to FIG. 1, a block diagram of an example of a computer system 100 that may provide for projection of a plurality of structured light patterns is shown. The computer system 100 may include a computing device 10 and a fabrication device 30.

The computing device 10 may be, among other things, any programmable machine that may carry out a sequence of logical operations. Examples of the computing device 10 may include a laptop, desktop, personal digital assistant (PDA), media player, imaging device, mobile Internet device (MID), any smart device such as a smart phone, smart tablet, smart TV, or the like. In this embodiment, the computing device may be a desktop computer. The computing device 10 may include a processing component 11, an interface 12, a sensor 13, a camera 14, a projector 15, a low-pass filter component 16, and a memory component 1

The processing component 11 may include at least one computer processor that may be utilized to execute computer-readable executable instructions. For example, as will be discussed in greater detail, the processing component 11 may be utilized to execute an application directed to projection of a plurality of structured light patterns. The interface 12 may allow a user to interact with the computing device 10. In this embodiment, the interface 12 may be a computer monitor displaying a graphical user interface (GUI). The sensor 13 may be a sensor to detect transmission of electromagnetic energy. In this embodiment, the sensor 13 may be a photo detector.

The camera 14 may be any device configured to capture an image or a video feed of an object or image. The projector 15 may be an optical device that projects an image onto a surface. In this embodiment, the projector 15 may include a projection screen.

The low-pass filter component 16 may be an electronic filter that passes through low-frequency signals, but attenuates (i.e., reduces amplitude of) signals with frequencies higher than a cutoff frequency. In this embodiment, the low-pass filter component may an electronic circuit.

The fabrication device 30 may be a device configured to fabricate a structured light pattern mask. In this embodiment the fabrication device 30 may be utilized to fabricate a combination mask 40.

The computing device memory 17 may be any device configured to store data. In this case, the first computing device memory 17 may store, among other things, a projection application 18, a first pattern 19, a second pattern 20, and a combination pattern bitmap 21. The computing device memory 17 may also store a returned image 22, a second pattern image 23, a preprocessing application 24, a preprocessed returned image 25, a preprocessed second pattern image 26, and a first pattern image 27.

The projection application 18 may be a software application that may be executed by a processor (e.g., the processing component 11). As will be discussed in greater detail below, the projection application 18 may be configured to generate the combination pattern bitmap 21, and utilize the combination pattern bitmap 21 to create the combination mask 40. In addition, the projection application 18 may also be configured utilize the combination pattern bitmap 21 and the combination mask 40 to generate the second pattern image 23 and the first pattern image 27.

Figure 2:
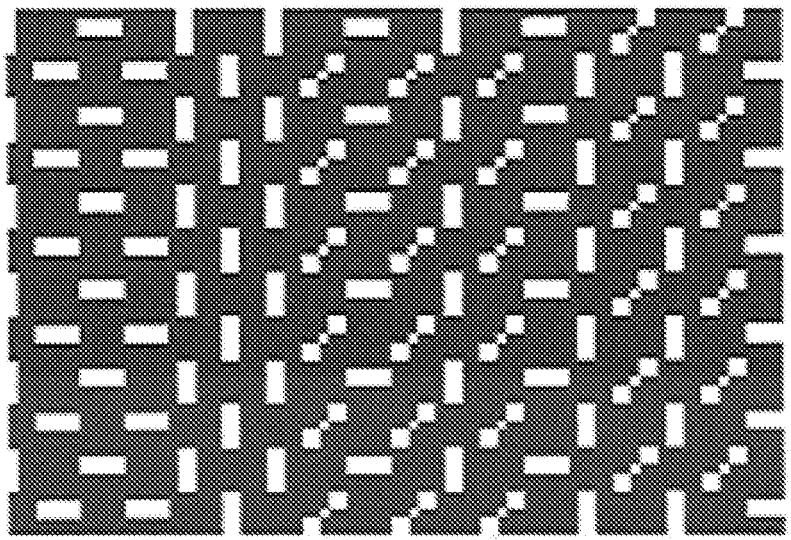
FIG. 2 is a illustration of an example of a high-resolution pattern in accordance with an embodiment of the invention.

The first pattern 19 may be a pattern that is used to create the combination pattern bitmap 21 and the combination mask 40. In this embodiment, the first pattern 19 may be a high-resolution pattern, and may take the form of a bitmap image. FIG. 2 illustrates an example of a high-resolution pattern 200.

Figure 3:
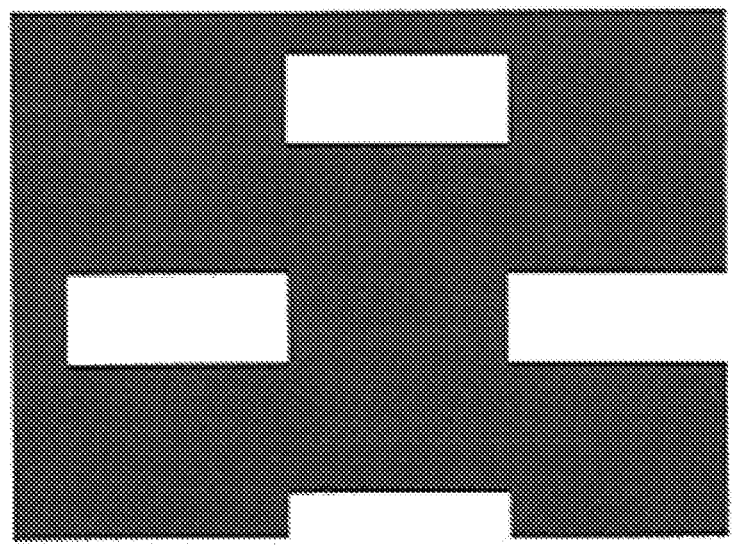
FIG. 3 is a illustration of an example of a low-resolution pattern in accordance with an embodiment of the invention.

The second pattern 20 may be a second pattern that may be used to create the combination pattern bitmap 21 and the combination mask 40. In this embodiment, the second pattern 20 may be a low-resolution pattern, and may take the form of a bitmap image. FIG. 3 illustrates an example of a low-resolution pattern 300.

Figure 4:
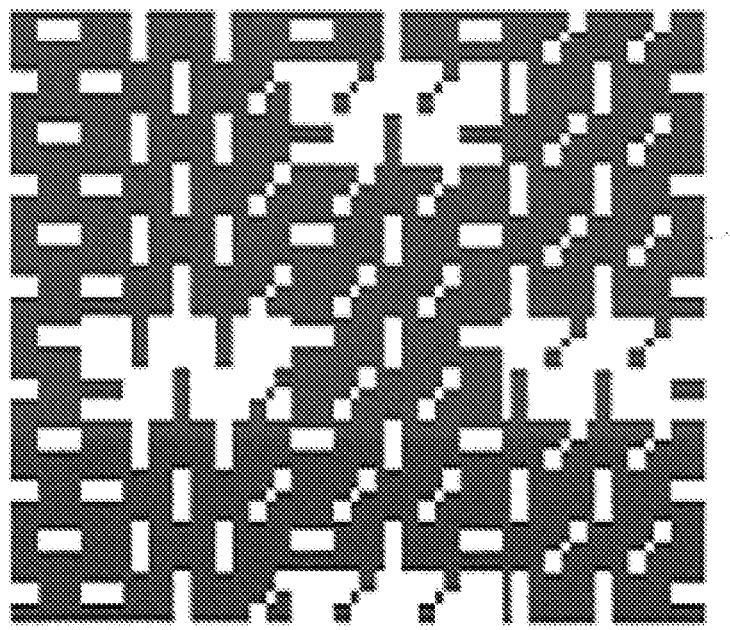
FIG. 4 is a illustration of an example of a combination pattern in accordance with an embodiment of the invention.

The combination pattern bitmap 21 may be a bitmap that may be generated using the first pattern 19 and the second pattern 20, and may be used to fabricate the combination mask 40 (e.g., using the fabrication device 30). The combination pattern bitmap 21 may be generated by the projection application 18. FIG. 4 illustrates an example of a combination pattern 400.

Turning back to FIG. 1, the returned image 22 may be an image that is returned as a result of a projection using the projector 15). More particularly, in this embodiment, the returned image 22 may be an image that is returned using the combination mask 40.

The second pattern image 23 may be an image that may be generated by the projection application 18. More particularly, the second pattern image 23 may be the result of application the low-pass filter component 16 to the returned image 22, and may represent an approximation of an image that would have been generated by the second pattern 20 alone.

The preprocessing application 24 may be an application utilized to prepare an image for processing. For example, in this embodiment, the preprocessing application 24 may be utilized to, among other things, perform a thresholding operation to convert a non-binary image to a binary (e.g., bitmap) format.

The preprocessed returned image 25 may be an image representation of the returned image 22 after having been passed through the preprocessing application 24. Similarly, the preprocessed second pattern image 26 may be an image representation of the second pattern image 23 after having been passed through the preprocessing application 24.

The first pattern image 27 may be an image that may be generated by the projection application 18, for example, using the preprocessed returned image 25 and the preprocessed second pattern image 26. The first pattern image 27 may represent an approximation of an image that would have been generated by the first pattern 19 alone.

The arrangement and numbering of blocks depicted in FIG. 1 is not intended to imply an order of operations to the exclusion of other possibilities. Those of skill in the art will appreciate that the foregoing systems and methods are susceptible of various modifications and alterations.

For example, in the embodiment illustrated in FIG. 1, the low-pass filter component may be an electronic circuit. However, this need not necessarily be the case. In other embodiments, the low-pass filter component may be a digital filter.

Figure 5:
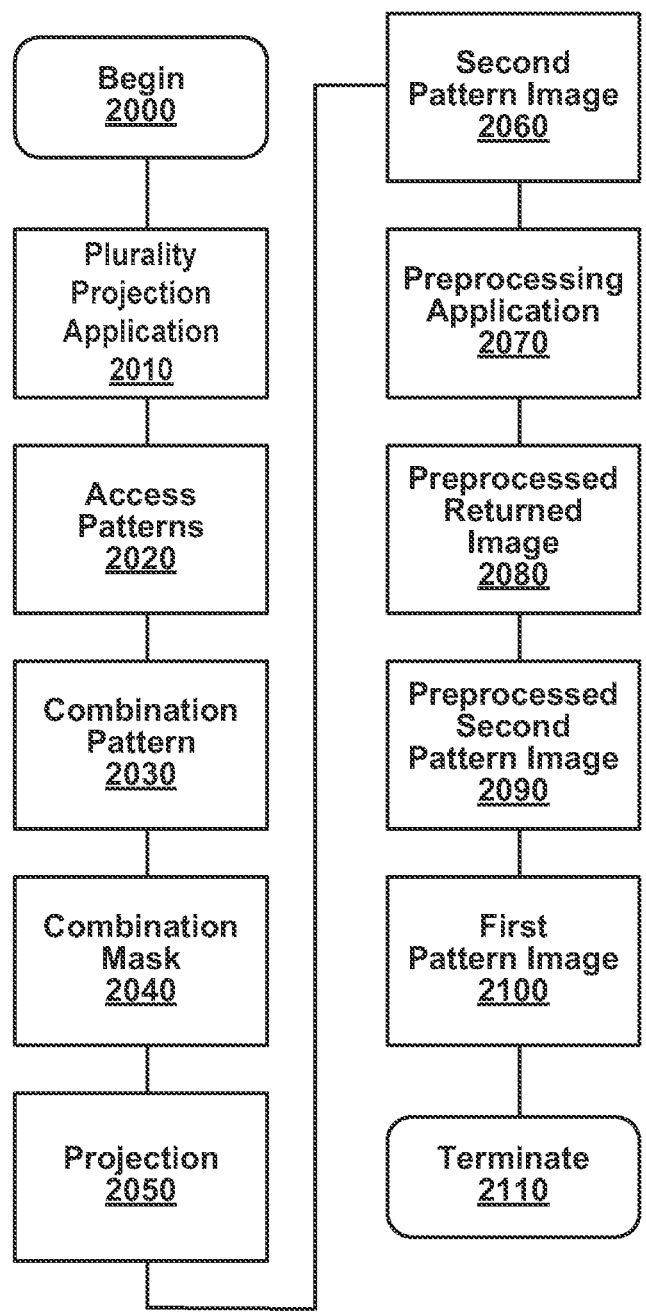
FIG. 5 is a flowchart of an example of a method of that may provide projection of a plurality of structured light patterns in accordance with an embodiment of the invention.

Turning now to FIG. 5, a flowchart of an example of a method that may provide projection of a plurality of structured light patterns in accordance with an embodiment of the invention is shown. The method might be implemented as a set of logic instructions stored in a machine- or computer-readable storage medium such as random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (AMC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as Java, Smalltalk, C++ or the like and conventional procedural programming languages, such as the "C" programming language or similar programming languages.

The process may begin at processing block 2000. At processing block 2010, a projection application, such as the projection application 18 (FIG. 1), stored on a computing device memory, such as the computing device memory 17 (FIG. 1), may be opened. At processing block 2020, the projection application may access a first (e.g., high-resolution) pattern, such as the first pattern 19 (FIG. 1), and a second (e.g., low-resolution) pattern, such as the second pattern 20 (FIG. 1) from the computing device memory. The first pattern and the second pattern may be stored in bitmap format.

At processing block 2030, the projection application may perform an exclusive-or (XOR) operation to combine the first pattern and the second pattern, resulting in a combination pattern bitmap, such as the combination pattern bitmap 21 (FIG. 1).

At processing block 2040, the projection application may utilize the combination pattern bitmap and a fabrication device, such as the fabrication device 30 (FIG. 1), to fabricate a combination mask, such as the combination mask 40 (FIG. 1). At processing block 2050, the combination mask may be used in conjunction with a projector, such as the projector 15 (FIG. 1), to generate a returned image, such as the returned image 22 (FIG. 1). More specifically, the returned image may be generated by projecting the combination mask onto the target image (i.e., the image for which depth and surface image is to be calculated), and capturing the returned image.

At processing block 2060, the returned image may be passed through a low-pass filter component, such as the low-pass filter component 16 (FIG. 1), to generate a second pattern image, such as the second pattern image 23 (FIG. 1). More specifically, the low-pass filter component may attenuate the high-spatial frequency components in the returned image to generate an approximation of the image that would have been generated utilizing the second pattern.

At processing block 2070, the projection application may access and open a preprocessing application, such as the preprocessing application 24 (FIG. 1). At processing block 2080, a thresholding function of the preprocessing application may be utilized to generate a preprocessed returned image, such as the preprocessed returned image 25 (FIG. 1). The preprocessed returned image may be a bitmap version of the returned image. At processing block 2090, the thresholding function of the preprocessing application may be utilized to generate a preprocessed second pattern image, such as the preprocessed second pattern image 26 (FIG. 1). The preprocessed second pattern image may be a bitmap version of the second pattern image.

At processing block 2100, the projection application may perform an exclusive-or (XOR) operation to combine the preprocessed returned image and the preprocessed second pattern image, resulting in a first pattern image, such as the first pattern image 27 (FIG. 1). The generated first pattern image may be an approximation of the image that would have been generated utilizing the first pattern in a projection process. At processing block 2110, the process may terminate.

The sequence and numbering of blocks depicted in FIG. 5 is not intended to imply an order of operations to the exclusion of other possibilities. Those of skill in the art will appreciate that the foregoing systems and methods are susceptible of various modifications, variations, and alterations.

For example, in the embodiment described above, the process may terminate after generating a second pattern image (i.e., processing block 2060) and a first pattern image (i.e., processing block 2100). However, in other embodiments, an application, such as the projection application, may continue to process the second pattern image and the first pattern image to remove image noise.

Embodiments may therefore provide a method of projecting a plurality of structured light patterns comprising generating a combination pattern bitmap utilizing a first pattern and a second pattern and fabricating a combination mask utilizing the combination pattern bitmap. The method may also provide generating a returned image utilizing the combination mask and generating a second pattern image utilizing the returned image, wherein the second pattern image is an approximation of an image that would have been generated utilizing the second pattern, and wherein the generating the second pattern image includes passing the returned image through a low-pass filter component.

In one example, the generating the combination pattern bitmap includes performing an exclusive-or (XOR) operation utilizing the first pattern and the second pattern.

In one example, the method may also include generating a preprocessed returned image and a preprocessed second pattern image and generating a first pattern image utilizing the preprocessed returned image and the preprocessed second pattern image, wherein first pattern image is an approximation of an image that would have been generated utilizing the first pattern.

In another example, the preprocessed returned image is generated utilizing a thresholding function.

In still another example, the preprocessed second pattern image is generated utilizing a thresholding function.

In one example, the generating a first pattern image includes performing an exclusive-or (XOR) operation utilizing the preprocessed returned image and the preprocessed second pattern image.

Embodiments may also include at least one machine readable medium comprising a plurality of instructions that in response to being executed on a computing device, cause the computing device to carry out any of the examples of the aforementioned method, an apparatus for projection of a plurality of structured light patterns including an interface and logic configured to perform any of the examples of the aforementioned method and a system for projection of a plurality of structured light patterns including an interface, a memory component, and logic configured to perform the method of any of the examples of the aforementioned method.

Still another embodiment may provide a method for projection of a plurality of structured light patterns comprising generating a combination pattern bitmap utilizing a first pattern and a second pattern, generating a returned image utilizing the combination pattern bitmap, and generating a second pattern image utilizing the returned image, wherein the second pattern image is an approximation of an image that would have been generated utilizing the second pattern;

In one example, the method may also include generating a preprocessed returned image and a preprocessed second pattern image and generating a first pattern image utilizing the preprocessed returned image and the preprocessed second pattern image, wherein first pattern image is an approximation of an image that would have been generated utilizing the first pattern.

In one example, the generating the combination pattern bitmap includes performing an exclusive-or (XOR) operation utilizing the first pattern and the second pattern.

In another example, the method may include fabricating a combination mask utilizing the combination pattern bitmap.

In still another example, the generating the second pattern image includes passing the returned image through a low-pass filter component.

In yet another example, the preprocessed returned image is generated utilizing a thresholding function.

In one example, the preprocessed second pattern image is generated utilizing a thresholding function.

In another example, the generating a first pattern image includes performing an exclusive-or (XOR) operation utilizing the preprocessed returned image and the preprocessed second pattern image.

Embodiments may also include at least one machine readable medium comprising a plurality of instructions that in response to being executed on a computing device, cause the computing device to carry out any of the examples of the aforementioned method, an apparatus for projection of a plurality of structured light patterns including an interface and logic configured to perform any of the examples of the aforementioned method and a system for projection of a plurality of structured light patterns including an interface, a memory component, and logic configured to perform the method of any of the examples of the aforementioned method.

Embodiments may also provide at least one computer readable storage medium comprising a set of instructions which, if executed by a processor, cause a computing device to generate a combination pattern bitmap utilizing a first pattern and a second pattern, generate a returned image utilizing the combination pattern bitmap, and generate a second pattern image utilizing the returned image, wherein the second pattern image is an approximation of an image that would have been generated utilizing the second pattern.

In one example, the set of instructions may also cause a computer to generate a preprocessed returned image and a preprocessed second pattern image and generate a first pattern image utilizing the preprocessed returned image and the preprocessed second pattern image, wherein first pattern image is an approximation of an image that would have been generated utilizing the first pattern.

Embodiments may therefore provide an apparatus comprising an interface, a processing component, and a memory component. The apparatus may also include a combination pattern module to generate a combination pattern bitmap utilizing a first pattern and a second pattern, a returned image module to generate a returned image utilizing the combination pattern bitmap, and a second pattern image module to generate a second pattern image utilizing the returned image, wherein the second pattern image is an approximation of an image that would have been generated utilizing the second pattern. The apparatus may also include a preprocessing module to generate a preprocessed returned image and a preprocessed second pattern image and a first pattern image module generate a first pattern image utilizing the preprocessed returned image and the preprocessed second pattern image, wherein first pattern image is an approximation of an image that would have been generated utilizing the first pattern.

Embodiments may include a system comprising a fabrication component and a computing device. The computing device may include an interface, a processing component, and a memory component. The computing device may also include a combination pattern module to generate a combination pattern bitmap utilizing a first pattern and a second pattern, a returned image module to generate a returned image utilizing the combination pattern bitmap, and a second pattern image module to generate a second pattern image utilizing the returned image, wherein the second pattern image is an approximation of an image that would have been generated utilizing the second pattern. In addition, the computing device may also include a preprocessing module to generate a preprocessed returned image and a preprocessed second pattern image and a first pattern image module generate a first pattern image utilizing the preprocessed returned image and the preprocessed second pattern image, wherein first pattern image is an approximation of an image that would have been generated utilizing the first pattern.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Techniques described herein may therefore provide a feed-forward system that ensures both real-Lime operation of the consumer video pipeline and dynamic updating of the operating pipeline to deliver optimal visual perceptual quality and viewing experience. In particular, a discrete control system for the video pipeline can dynamically adapt operating points in order to optimize a global configuration of interactive component modules that are related to video perceptual quality. In a series configuration, the perceptual quality analysis module may be placed before the video processing pipeline and is parameters determined for the post-processing pipeline may be used for the same frame. In the case of distributed computation of the quality analysis block or when perceptual quality analysis needs to be performed at intermediate points in the pipeline, the parameters determined using a given frame may be applied on the next frame to ensure real-time operation. Distributed computation is sometimes beneficial in reducing complexity as certain elements for perceptual quality computation may already be computed in the post-processing pipeline and can be re-used. Illustrated approaches may also be compatible with closed-loop control where the perceptual quality analysis is re-used at the output of the video processing pipeline to estimate output quality, which is also used by the control mechanism.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog tines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing systems memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method of projecting a plurality of structured light patterns, comprising:
   projecting a combination pattern bitmap generated from a combined a first pattern with a second pattern;
   capturing a returned image as a result of the projecting of the combination pattern bitmap;
   generating a filtered image formed by filtering the returned image, wherein the filtered image is an approximation of an image that would have been generated utilizing the second pattern by itself;
   generating a preprocessed returned image and a preprocessed filtered image; and
   generating a further image utilizing the preprocessed returned image and the preprocessed filtered image, wherein the further image is an approximation of an image that would have been generated utilizing the first pattern by itself.

2. The method of claim 1, wherein the preprocessed returned image is generated utilizing a thresholding function.

3. The method of claim 1, wherein the preprocessed filtered image is generated utilizing a thresholding function.

4. The method of claim 1, wherein the generating the further image includes performing an exclusive-or (XOR) operation utilizing the preprocessed returned image and the preprocessed filtered image.

5. The method of claim 1, wherein the generating the combination pattern bitmap includes performing an exclusive-or (XOR) operation utilizing the first pattern and the second pattern.

6. The method of claim 1, including fabricating a combination mask utilizing the combination pattern bitmap.

7. The method of claim 1, wherein the generating the filtered image includes passing the returned image through a low-pass filter component.

8. At least one computer readable storage medium comprising a set of instructions which, if executed by a processor, cause a computing device to:
   project a combination pattern bitmap generated from a combined first pattern with a second pattern;
   capture a returned image as a result of the projecting;
   generate a filtered image formed by filtering the returned image, wherein the filtered image is an approximation of an image that would have been generated utilizing the second pattern by itself;
   generate a preprocessed returned image and a preprocessed filtered image; and
   generate a further image utilizing the preprocessed returned image and the preprocessed filtered image, wherein further image is an approximation of an image that would have been generated utilizing the first pattern by itself.

9. The at least one medium of claim 8, wherein the preprocessed returned image is to be generated utilizing a thresholding function.

10. The at least one medium of claim 8, wherein the preprocessed filtered image is to be generated utilizing a thresholding function.

11. The at least one medium of claim 8, wherein the generating a further image is to include performing an exclusive-or (XOR) operation utilizing the preprocessed returned image and the preprocessed filtered image.

12. The at least one medium of claim 8, wherein, if executed, the instructions cause a computing device to fabricate a combination mask utilizing the combination pattern bitmap.

13. The at least one medium of claim 8, wherein the preprocessed filtered image is to be generated utilizing a thresholding function.

14. The at least one medium of claim 8, wherein the generating the filtered image is to include passing the returned image through a low-pass filter component.

15. An apparatus, comprising:
   an interface;
   a processing component;
   a memory component;
   a projector;
   a combination pattern module to generate a combination pattern bitmap generated from a combined a first pattern with a second pattern;
   a returned image module to generate a returned image as a result of projecting the combination pattern bitmap; and
   a filtered image module to generate a filtered image formed by filtering the returned image, wherein the filtered image is an approximation of an image that would have been generated utilizing the second pattern by itself;
   a preprocessing module to generate a preprocessed returned image and a preprocessed filtered image; and
   a further image module to generate a further image utilizing the preprocessed returned image and the preprocessed filtered image, wherein the further image is an approximation of an image that would have been generated utilizing the first pattern by itself.

16. The apparatus of claim 15, further including a sensor configured to detect transmission of electromagnetic energy by the projector.

17. The apparatus of claim 15, further including a low-pass filter component configured to receive the returned image following projection.

18. The apparatus of claim 17, wherein the generating the filtered image is to include passing the returned image through the low-pass filter component.

19. The apparatus of claim 15, wherein the generating the combination pattern bitmap is to include performing an exclusive-or (XOR) operation utilizing the first pattern and the second pattern.

20. The apparatus of claim 15, wherein the generating the further image is to include performing an exclusive-or (XOR) operation utilizing the preprocessed returned image and the preprocessed filtered image.

21. A system, comprising:
   a fabrication component configured to fabricate a structured light pattern mask; and
   a computing device including:
     an interface;
     a processing component;
     a memory component;
     a combination pattern module to generate a combination pattern bitmap utilizing a first pattern and a second pattern;
     a projector configured to project the combination pattern bitmap;
     a returned image module to generate a returned image as a result of projecting the combination pattern bitmap;
     a filtered image module to generate a filtered image formed by filtering the returned image, wherein the filtered image is an approximation of an image that would have been generated utilizing the second pattern by itself;

a preprocessing module to generate a preprocessed returned image and a preprocessed filtered image; and
   a further image module to generate a further image utilizing the preprocessed returned image and the preprocessed filtered image, wherein the further image is an approximation of an image that would have been generated utilizing the first pattern by itself.

22. The system of claim 21, wherein the computing device includes a sensor to detect transmission of electromagnetic energy by the projector.

23. The system of claim 21, wherein the computing device includes a low-pass filter component configured to receive the returned image following projection.

24. The system of claim 13, wherein the generating the filtered image is to include passing the returned image through a low-pass filter component.

25. The system of claim 21, wherein the generating the combination pattern bitmap is to include performing an exclusive-or (XOR) operation utilizing the first pattern and the second pattern.

26. The system of claim 21, wherein the generating a further image is to include performing an exclusive-or (XOR) operation utilizing the preprocessed returned image and the preprocessed filtered image.

27. The system of claim 21, wherein the preprocessed returned image and the preprocessed filtered image are to be generated utilizing a thresholding function.

\* \* \* \* \*